3,349,056
POLYOLEFIN COMPOSITIONS STABILIZED WITH EPOXYALKANOAMIDES
Lloyd H. Wartman, Charleston, and Charles E. Ladish, South Charleston, W. Va., assignors to Union Carbide Corporation, a corporation of New York
Filed Sept. 27, 1965, Ser. No. 490,332
12 Claims. (Cl. 260—30.4)

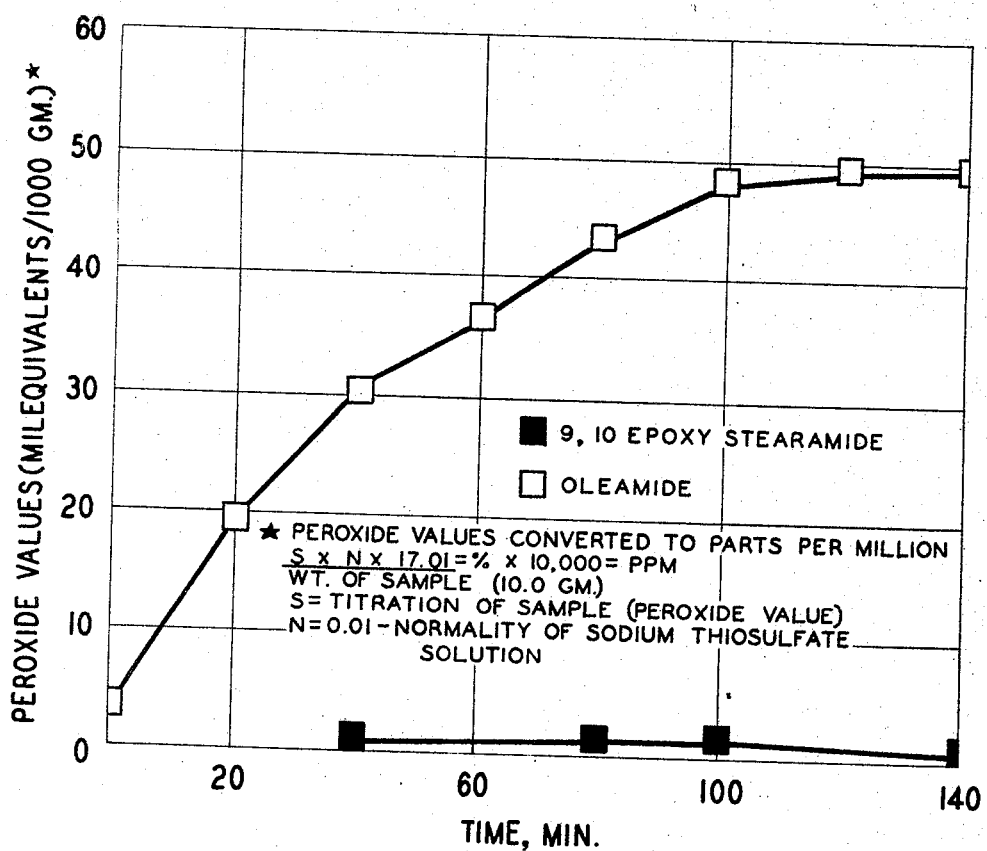

ABSTRACT OF THE DISCLOSURE

Polyolefin resins are stabilized with monoepoxyalkanoamides and polyepoxyalkanoamides at a concentration of from 0.01 to 1 weight percent of the mixture. The polyolefins have known utilities.

This invention relates to improved polyolefin compositions. More specifically it is concerned with compositions comprising solid polymers of monounsaturated alpha olefins and an effective amount of a slip and non-blocking agent.

It is known that polyolefin films, such as polyethylene, the polypropylenes, polybutene, poly 4-methylbutene-1, poly(ethylene/propylene) copolymer, poly(ethylene/butene) copolymer and the known modified olefin polymers containing in the molecule a minor amount of a copolymerized monomer or modifier, have a tendency when rolled into a roll or stacked to stick to themselves. This is known in the art as blocking and as a result thereof the film resists separation from its adjacent layer causing difficulties in handling such as the opening of bags for filling, etc. Another problem encountered is poor slip, i.e., the resistance between adjacent layers of film to readily slide over each other. A film having poor slip properties poses problems during its passage through the automatic processing equipment in use today and cuts down on the output that the fabricator can obtain from a heat sealer, bag maker, bag loader or filler, bag opener, overwrapper, etc. Thus, from a commercial point of view it is desired to have polyolefin films having the lowest possible tendency to block and the best possible slip characteristics.

The use of slip agents to reduce the coefficient of friction of the film sliding over itself and thus improve the slip characteristics is known. The most commonly used slip agents have been the monounsaturated fatty acid amides containing from about 18 to 22 carbon atoms, for example oleamide and erucamide. While three slip agents have been accepted commercially, they have always been a source of concern because of their tendency to undergo oxidative attack at the double bond which results in the formation of odor and/or color in the film and can also lead to loss of slip and to blocking. Attempts to overcome these deficiencies in the known slip agents have been made by incorporating antioxidants along with the known slip agents in the polyolefin formulation; however, these attempts have not been the complete solution to the problem. The antioxidants themselves have a tendency to develop a color and polyolefins containing them have shown a tendency to develop a yellow color more readily than those which do not contain antioxidants, under certain aging conditions. The antioxidants also have a tendency to encourage gel formation resulting in fisheyes in the film. In some instances, the known slip agents and antioxidants have been known to exude to the surface of the film, deposit thereon and cause problems both in processing and in use.

It has now been found that compositions comprising a solid polymer of monounsaturated alpha olefins and an epoxide of an unsaturated fatty acid amide have unexpected and unobvious improved properties in respect to blocking and slip. These improved properties are achieved without any appreciable deleterious effect on the other desired properties of polyolefin films, such as adhesion, printability, etc.

The use of the epoxides of unsaturated fatty acid amides in the compositions of the present invention provides decided commercial advantages. As previously indicated it has been necessary, in the past, to employ both a slip and antiblocking agent plus one or more antioxidants; however, by the use of the slip and antiblock compounds of this invention one can obtain adequate improvement by using said compounds alone. The epoxides of the unsaturated fatty acid amides provide the properties needed, in a single compound and make it unnecessary to include in the composition an antioxidant or stabilizer.

The unexpected oxidation stability of the epoxide compounds used in this invention can be illustrated by a comparison of the stability of oleamide and its epoxy derivative 9,10-epoxystearamide. In this test the refined compound was maintained at 140° C. and air was sparged through the molten mass for 100 minutes. The peroxide content of the oleamide treated in this manner increased to about 50 milliequivalents per 1000 grams. The same treatment barely affected the peroxide content of 9,10-epoxystearamide; a value of less than 3 milliequivalents per 1000 grams was found. The drawing graphically compares the stability of oleamide and 9,10-epoxystearamide.

The unsaturated fatty acids from which the amides can be produced by known procedures are well known. The monounsaturated fatty acids are disclosed for example, on page 175 of volume 6 of the Encyclopedia of Chemical Technology, edited by Kirk and Othmer and published in 1951 by the Interscience Encyclopedia, Inc. New York. Some polyunsaturated fatty acids are found on page 176 of the same encyclopedia. In addition a representative list of unsaturated fatty acids can be found on page 985 of the test, Advanced Organic Chemistry, Fieser and Fieser published in 1961 by Reinhold Publishing Corp., New York. For the purposes of this invention those fatty acids referred to in said publications that contain at least 14 carbon atoms in the molecule are incorporated herein by reference.

The unsaturated fatty acids are readily converted, by well known procedures obvious to the average skilled scientist, to their corresponding amides. Thus, for example the free acid can be esterified with a low molecular weight alcohol and then the ester can be reacted with ammonia to form the amide. For instance, erucic acid can be reacted with ethyl alcohol to produce ethyl erucate; this is then reacted with ammonia to produce the erucamide.

The epoxide compounds are produced by known procedures from the corresponding unsaturated fatty acid amide. The epoxidation can be carried out, for example, at a temperature of from about —25° C. to about 150° C. using a solution of peracetic acid in an organic solvent such as ethyl acetate.

The methods for producing amides of the fatty acids and epoxides of unsaturated compounds are so well known in the art that no purpose would be served in going into minute detail. From the descriptions heretofore set forth and the voluminous literature available the average person skilled in the art would experience little or no difficulty.

The epoxides of the unsaturated fatty acid amides found suitable contain at least one oxirane ring structure

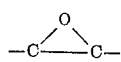

in the molecule. When one has used a polyunsaturated fatty acid amide as the starting compound it is preferred that all of the double bonds be converted to the oxirane structure since such compounds are more stable and less subject to oxidative degradation than are those in which less than all of the unsaturated sites had been transformed to oxirane units. In some cases, where oxidation stability is not critical, one need not have all of the unsaturated sites in a polyunsaturated compound converted to an oxirane ring; in some instances it may be desired to have fewer than all of them so reacted and such compounds are still suitable for producing the compositions of this invention. It is to be noted that in the past the polyunsaturated acids have been completely unsuitable because of their excessive tendencies to undergo oxidation and polymerization.

Among the epoxides of the unsaturated fatty acid amides or epoxy alkanoamides that can be used are the monoepoxy fatty acid amides containing from 14 to about 30 carbon atoms of the formula

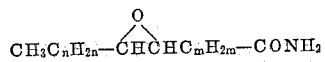

and the polyepoxy fatty acid amides containing from 14 to about 20 carbon atoms of the formula

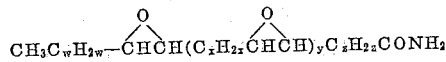

wherein $n$ is an integer having a value of from 3 to 15, $m$ is an in integer having a value of from 3 to 19, with the sum of $n$ plus $m$ having a value of from 10 to about 26; $w$ is an integer having a value of from 0 to about 7, $x$ is an integer having a value of from 0 to about 6, $z$ is an integer having a value of from about 2 to about 8, $y$ is an integer having a value of from 1 to 3, with the sum of $w$, $x$ and $z$ having a value of from 4 to 14. As previously indicated, the total number of carbon atoms in the monoepoxy compounds is from 14 to about 30 and the total number of carbon atoms in the polyepoxy compounds is from 14 to about 20.

Illustrative of the suitable compounds, but not limitative thereof, one can mention:

5,6-epoxytetradecanoamide
9,10-epoxytetradecanoamide
9,10-epoxyhexadecanoamide
9,10-epoxyoctadecanoamide
6,7-epoxyoctadecanoamide
11,12-epoxyoctadecanoamide
9,10-epoxyeicosanoamide
5,6-epoxyeicosanoamide
11,12-epoxydecosanoamide
5,6-epoxydocosanoamide
13,14-epoxydocosanoamide
15,16-epoxytetracosanoamide
17,18-epoxyhexacosanoamide
21,22-epoxytriacontanoamide
9,10-,12,13-diepoxyoctadecanoamide
5,6-,13,14-diepoxydocos-9-noamide
9,10-,11,12-,13,14-triepoxyoctadecanoamide
9,10-,11,12-diepoxyoctadec-13-enoamide
9,10-,12,13-,15,16-triepoxyoctadecanoamide
10,11-,12,13-,14,15-triepoxyoctadecanoamide
6,7-,10,11-,14,15-triepoxyhexadecanoamide
4,5-,8,9-12,13-,15,16-tetraepoxyoctadecanoamide
9,10-,11,12-,13,14-,15,16-tetraepoxyoctadecanoamide
5,6-,8,9-,11,12-,14,15-tetraepoxyeicosenoamide
and the like.

The amount of epoxide compound added to the solid polyolefin can be from about 0.01 to about 1 percent by weight of the polyolefin. The preferred concentration is from 0.025 to about 0.2 percent by weight. It has been noted that some of the epoxide compounds improve slip to a greater extent than others and that in some instances a particular epoxide compound may have a more pronounced effect on blocking than does another epoxide compound. For this reason, it is often desirable to use a mixture of two or more epoxide additives in producing the blend. To avoid undesirable effects on the properties of the polyolefin, it is preferred to limit the amount of additives introduced to those quantities set forth hereinbefore. The epoxides of the unsaturated fatty acid amides can be incorporated into the solid polyolefin by any of the well known dry or solution techniques. These procedures are so well known to those skilled in the art that any description thereof herein would be superfluous. As is also obvious, one can include pigments, fillers and other known additives during the preparation of the blend.

Blocking was determined by the procedure set forth in ASTM D-1893-61T using film aged 24 hours at 73° F. and 50 percent relative humidity and film aged 24 hours at 140° F. and low relative humidity under a pressure of 0.2 p.s.i.

Slip or coefficient of friction was determined by the procedure set forth in ASTM D-1894-61T using film aged 30 minutes or 24 hours at 73° F. and 50 percent relative humidity.

The following examples further serve to describe the invention; but they are not to be construed as limiting it thereto.

*Example 1*

A one percent masterbatch of 9,10-epoxyoctadecanoamide in a solid polyethylene base resin having a density of 0.920 gram per cubic centimeter and a melt index of 2.0 decigrams per minute was prepared by adding the proper amount of the epoxide to the partially fluxed polyethylene in a Banbury mixer. Fluxing was continued until a homogeneous mixture was obtained; the composition was then extruded and pelletized. Appropriate amounts of the masterbatch pellets were blended with additional base resin to produce blends having 9,10-epoxyoctadecanoamide concentrations of 0.036, 0.07 and 0.1 percent by weight. Each blend was extruded in conventional manner using a tubular die to produce film of 1.5 mil thickness (Film A).

Films free of any of the additive were produced from the same base resin after it had been subjected to the same physical treatment (Film B).

The slip coefficient of friction and blocking properties of the films were determined and are set forth in Table I. As can be seen, the films containing 9,10-epoxyoctadecanoamide, Film A, show decided improvement in both slip and blocking properties when compared to the slip and blocking properties of the control films, Film B. It was also observed that this epoxyamide shows some improvements over blends containing 9-octadeceneoamide in blocking. Film A shows no evidence of odor or color development on prolonged storage at room temperature.

TABLE I

| | Coefficient of Friction [1] | | Blocking force in grams to separate after 24 hours | | |
|---|---|---|---|---|---|
| | 0.5 hour | 24 hours | I to I [2] | I to I [3] | 0 to 0 [4] |
| 0.036% Additive: | | | | | |
| Film A | 0.84 | 0.69 | 12 | 56 | 61 |
| Film B [5] | >1 | >1 | 19 | 105 | 92 |
| 0.070% Additive: | | | | | |
| Film A | 0.38 | 0.50 | 9 | 27 | 23 |
| Film B | >1 | >1 | 19 | 105 | 92 |
| 0.100% Additive: | | | | | |
| Film A | 0.33 | 0.42 | 5 | 2 | 2 |
| Film B | >1 | >1 | 19 | 105 | 92 |

[1] Determined after aging for the time indicated at 73° F. and 50 percent relative humidity by ASTM D-1894-61T test procedure.
[2] Determined on 8 by 10 inch square sheets of film maintained 24 hours at 73° F. and 50 percent relative humidity under a pressure of 0.2 p.s.i. with contact between sheets being of the two inside surfaces, ASTM D-1893-61T.
[3] Determined on 8 by 10 inch square sheets of film maintained 24 hours at 140° F. and low relative humidity under a pressure of 0.2 p.s.i. with contact between sheets being of the two inside surfaces of the extruded film.
[4] Determined on 8 by 10 inch square sheets of film maintained 24 hours at 140° F. and low relative humidity under a pressure of 0.2 p.s.i. with contact between sheets of the two outside surfaces of the extruded film.
[5] Film B is the base resin free of the additives added to Film A.

It can be seen from the data represented that the overall properties of the compositions of this invention are more desirable than the overall properties of the other compositions discussed. There is no evidence of color formation or exudation in any of the Film A samples after long standing at normal conditions. Similar results are obtained even after Film A has been treated with a 100 watt corona discharge impinged on the film while it is travelling at a rate of 45 feet per minute. Sheets of films produced from the unmodified base resin, Film B, and films from blends containing 9-octadecenoamide fused together in the induced blocking tests after aging for 24 hours at 140° F.

In a similar manner the following compositions are produced:

| Resin: | Additive |
|---|---|
| Polyethylene | 9,10-epoxytetradecanoamide. |
| do | 5,6-epoxyeicosenoamide. |
| do | 15,16-epoxytetracosanoamide. |
| do | 5,6-,13,14-diepoxydocosanoamide. |
| Polypropylene | 9,10-epoxyoctadecanoamide. |
| do | 11,12-epoxyhexadecanoamide. |
| Poly(ethylene/propylene) | 9,10-epoxyoctadecanoamide. |

*Example 2*

A one percent masterbatch of 13,14-epoxydocosanoamide in a solid polyethylene base resin having a density of 0.920 gram per cubic centimeter and a melt index of 2.0 decigrams per minute was prepared as described in Example 1. The masterbatch was then blended with additional base resin to produce blends having 13,14-epoxydocosanoamide concentrations of 0.036, 0.07 and 0.1 percent by weight and the blends were extruded to produce film, as described in Example 1 (Film A).

Films free of any of these additives were produced from the same base resin after it had been subjected to the same physical treatment (Film B).

The slip and coefficient of friction and blocking properties of these films are set forth in Table II. The data shows that the films containing 13,14-epoxydocosanoamide, Film A, showed decided improvements in both slip and blocking properties when compared to the slip and blocking properties of the control films, Film B. It was observed that this epoxyamide shows improvements in blocking properties over the use of 13-docosenoamide.

TABLE II

| | Coefficient of Friction [1] | | Blocking force in grams to separate after 24 hours | | |
|---|---|---|---|---|---|
| | 0.5 hour | 24 hours | I to I [2] | I to I [3] | 0 to 0 [4] |
| 0.036% Additive: | | | | | |
| Film A | >1 | >1 | 15 | 62 | 17 |
| Film B [5] | >1 | >1 | 19 | 105 | 92 |
| 0.070% Additive: | | | | | |
| Film A | 0.53 | 0.96 | 12 | 36 | 3 |
| Film B | >1 | >1 | 19 | 105 | 92 |
| 0.100% Additive: | | | | | |
| Film A | 0.36 | 0.60 | 9 | 56 | 5 |
| Film B | >1 | >1 | 19 | 105 | 92 |

See footnotes 1, 2, 3, 4, 5, Table I.

*Example 3*

A commercial mixture of soya oil amide containing about 86.3 weight percent 9-octadecanamide, about 13.7 weight percent 9,12-octadecadienamide, and about 4 weight percent octadecanamine was epoxidized in conventional manner with peracetic acid. The epoxidized product that was recovered was a mixture of 9,10-epoxyoctadecanoamide, 9,10-,12,13 - diepoxyoctadecanoamide and epoxyoctadecanoamine; it had a melting point of 74° C. to 76° C. and an epoxy equivalent of 332.

A one percent masterbatch of the above-described epoxidized soya oil amide was prepared as described in Example 1. The masterbatch was then blended with additional polyethylene to produce blends having 0.036, 0.07 and 0.1 percent by weight of epoxidized soya oil amide. These blends were extruded to produce 1.5 mils film as described in Example 1 (Film A).

Films were also produced from the base resin after it had been subjected to the same physical treatment (Film B).

The results are tabulated in Table III.

TABLE III

| | Coefficient of Friction [1] | | Blocking force in grams to separate after 24 hours | | |
|---|---|---|---|---|---|
| | 0.5 hour | 24 hours | 1 to 1 [2] | 1 to 1 [3] | 0 to 0 [4] |
| 0.036% Additive: | | | | | |
| Film A | >1 | 0.38 | 13 | 78 | 61 |
| Film B | >1 | 0.92 | 15 | 80 | 84 |
| 0.070% Additive: | | | | | |
| Film A | 0.94 | 0.23 | 14 | 56 | 67 |
| Film B | >1 | 0.92 | 15 | 80 | 84 |
| 0.100% Additive: | | | | | |
| Film A | 0.60 | 0.21 | 14 | 50 | 53 |
| Film B | >1 | 0.92 | 15 | 80 | 84 |

See footnotes 1, 2, 3, 4, Table I.

What is claimed is:

1. A polyolefin composition comprising a normally solid polyolefin containing therein from 0.01 to 1 weight percent of an epoxyalkanoamide selected from the group consisting of monoepoxyalkanoamides containing from 14 to about 30 carbon atoms of the formula:

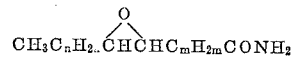

and the polyepoxyalkanoamides containing from 14 to about 20 carbon atoms of the formula:

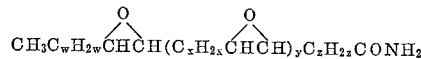

wherein $n$ is an integer having a value of from 3 to about 15, $m$ is an integer having a value of from 3 to about 19, with the sum of $n$ plus $m$ having a value of from 10 to about 26; $w$ is an integer having a value of from 0 to about 7, $x$ is an integer having a value of from 0 to about 6, $z$ is an integer having a value of from 2 to about 8, $y$ is an integer having a value of from 1 to 3, with the sum of $w$, $x$ and $y$ having a value of from 4 to about 14.

2. A polyolefin composition as claimed in claim 1 wherein the concentration of said epoxyalkanoamide therein is from about 0.025 to about 0.2 weight percent.

3. A polyolefin composition comprising normally solid polyethylene containing therein from 0.01 to 1 weight percent of an epoxyalkanoamide selected from the group consisting of monoepoxyalkanoamides containing from 14 to about 30 carbon atoms of the formula:

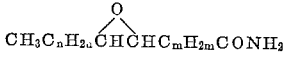

and the polyepoxyalkanoamides containing from 14 to about 20 carbon atoms of the formula:

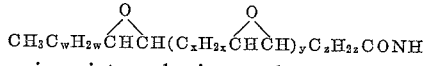

wherein $n$ is an integer having a value of from 3 to about 15, $m$ is an integer having a value of from 3 to about 19, with the sum of $n$ plus $m$ having a value of from 10 to about 26; $w$ is an integer having a value of from 0 to about 7, $x$ is an integer having a value of from 0 to about 6, $z$ is an integer having a value of from 2 to about 8, $y$ is an integer having a value of from 1 to 3, with the sum of $w$, $x$ and $z$ having a value of from 4 to about 14.

4. A polyolefin composition as claimed in claim 3 wherein the concentration of said epoxyalkanoamide therein is from about 0.025 to about 0.2 weight percent.

5. A polyolefin composition comprising normally solid polyethylene containing from 0.025 to 0.2 weight percent of 9,10-epoxyoctadecanoamide.

6. A polyolefin composition comprising normally solid polyethylene containing from 0.025 to 0.2 weight percent of 13,14-epoxydocosanoamide.

7. A polyolefin composition comprising normally solid polyethylene containing from 0.025 to 0.2 weight percent of epoxidized soya oil amide.

8. A polyolefin composition comprising normally solid polypropylene containing therein from 0.01 to 1 weight percent of an epoxyalkanoamide selected from the group consisting of monoepoxyalkanoamides containing from 14 to about 30 carbon atoms of the formula:

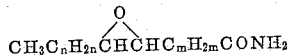

and the polyepoxyalkanoamides containing from 14 to about 20 carbon atoms of the formula:

wherein $n$ is an integer having a value of from 3 to about 15, $m$ is an integer having a value of from 3 to about 19, with the sum of $n$ plus $m$ having a value of from 10 to about 26; $w$ is an integer having a value of from 0 to about 7, $x$ is an integer having a value of from 0 to about 6, $z$ is an integer having a value of from 2 to about 8, $y$ is an integer having a value of from 1 to 3, with the sum of $w$, $x$ and $z$ having a value of from 4 to about 14.

9. A polyolefin composition as claimed in claim 8 wherein the concentration of said epoxyalkanoamide therein is from about 0.025 to about 0.2 weight percent.

10. The polyolefin composition of claim 1 in the form of a film.

11. The polyolefin composition of claim 3 in the form of a film.

12. The polyolefin composition of claim 8 in the form of a film.

References Cited

UNITED STATES PATENTS

| | | | |
|---|---|---|---|
| 2,692,271 | 10/1954 | Greenspan | 260—30.4 |
| 2,779,771 | 1/1957 | Phillips et al. | 260—30.4 |
| 3,176,021 | 3/1965 | Volungis et al. | |

MORRIS LIEBMAN, *Primary Examiner.*

L. T. JACOBS, *Assistant Examiner.*